United States Patent
Hewett et al.

(10) Patent No.: US 6,393,022 B1
(45) Date of Patent: May 21, 2002

(54) METHOD AND APPARATUS FOR INTEGRATED SERVICES DIGITAL NETWORK USER PART (ISUP) SIGNALING LOOPBACK

(75) Inventors: Jeffrey Allen Hewett, Cary; Keven Todd Chapman, Raleigh, both of NC (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 08/974,222

(22) Filed: Nov. 19, 1997

(51) Int. Cl.[7] .............................................. H04L 12/50
(52) U.S. Cl. ........................ 370/385; 370/410; 370/524
(58) Field of Search ................................. 370/438, 439, 370/465, 466, 467, 469, 522, 264, 524, 384, 385, 410; 379/229, 230

(56) References Cited

U.S. PATENT DOCUMENTS 5,377,186 A * 12/1994 Wegner et al. .............. 370/220
5,854,835 A * 12/1998 Montgomery et al. ....... 379/119
5,854,836 A * 12/1998 Nimmagadda ............... 379/207
5,881,132 A * 3/1999 O'Brien et al. ................ 379/35
5,943,409 A * 8/1999 Malik .......................... 379/209
6,061,364 A * 5/2000 Hager et al. ................. 370/467

OTHER PUBLICATIONS

Travis Russel, Signaling System # 7, 1998, McGraw–Hill, 2nd Edition. pp. 109–110.*

* cited by examiner

Primary Examiner—Chau Nguyen
Assistant Examiner—Soon-Dong Hyun
(74) Attorney, Agent, or Firm—Withrow & Terranova, P.L.L.C.

(57) ABSTRACT

A method and apparatus are provided for processing Integrated Services Digital Network User Part (ISUP) signaling within a switching system. ISUP signaling messages associated with a plurality of ISL trunks are processed within a switching system by provisioning the ISL trunks, identifying the ISUP signaling messages that are associated with the ISL trunks, and routing the identified ISUP signaling messages within the switching system to the far endpoints of the trunks using layers 1, 2, and 3 of Open System Interconnection (OSI) protocol.

16 Claims, 10 Drawing Sheets

METHOD AND APPARATUS FOR INTEGRATED SERVICES DIGITAL NETWORK USER PART (ISUP) SIGNALING LOOPBACK

TECHNICAL FIELD

The present invention relates to the field of Integrated Services Digital Network User Part (ISUP) signaling, and more particularly to the processing and routing of ISUP signaling messages within a switching system.

BACKGROUND OF THE ART

Signaling is the process of transferring information to control the setup, holding and releasing of connections in a communications network. The network may be a public telephone network or a switched private telephone network. In a network, signaling may be divided into two parts: customer line signaling and inter-office trunk signaling. Customer line signaling refers to the interaction between a telephony agent and the switching system serving the customer. Interoffice trunk signaling is concerned with the exchange of call-handling information between switching offices within a network.

Today, communications networks commonly use two types of signaling techniques: traditional in-band signaling and out-of-band signaling. For traditional in-band signaling, signaling information is transmitted on the same wire or trunk and follows the same transmission path as the call itself. For out-of-band signaling, signaling information pertaining to a call is transmitted on a separate dedicated facility known as a signaling link.

Signaling System 7 (SS7) is an industry standard for out-of-band signaling in a communications network. In a SS7 network, signaling information is carried in packets between switching systems in much the same manner as X.25 or other packet switching protocols. An SS7 network provides increased bandwidth for call signaling and increased capability for providing advanced network services across different network platforms.

The SS7 protocol is comprised of four layers. Layers 1, 2 and 3, collectively referred to as the Message Transfer Part (MTP), provide the basic infrastructure for transporting signaling messages across the SS7 network. MTP is compliant with layers 1, 2 and 3 of the Open System Interconnection (OSI) standard. Layers 1, 2 and 3 of OSI are defined in ITU-T X.200.

Layer 4 of the SS7 protocol consists of three parts: Signaling Connection Control Part (SCCP), Integrated Services Digital Network User Part (ISUP), and Transaction Capability Application Part (TCAP). SCCP provides additional routing and network management services to MTP. TCAP provides connectionless communications between applications on a network using a generic standard language.

ISUP provides connection-oriented signaling between nodes on a communications network. This type of signaling provides the capability to set up and take down calls and to monitor the facilities on which calls are transported. Furthermore, ISUP is a service-rich protocol which provides the capability to communicate large amounts of information associated with calls over signaling links. This service-rich aspect of the ISUP protocol is particularly attractive to telephone service providers because it supports advanced network services such as, caller ID, call screening, and automatic recall, across different switching systems and telephony agents.

ISUP signaling protocol is defined in GR-246-CORE, "Bellcore Specification of Signaling System 7", Volume 3, American National Standards Institute (ANSI) T1.113-1988, and International Telecommunications Union—Telecommunication Standardization Sector (ITU-T) Q.761, Q.762, Q.763, Q.764, Q.766, "Specifications of Signalling System No. 7 ISDN User Part."

A telephone switching office which supports SS7 signaling is referred to as a Service Switching Point (SSP). Each switching office is assigned a unique point code for the purpose of identifying the office in the telephone network. Typically, a switching office includes a switching system which is connected to switching systems in other switching offices via inter-office trunks.

A trunk for which ISUP signaling information is handled on a separate signaling link is referred to as an ISUP trunk. An ISUP trunk that originates from and terminates at the same SSP is referred to as an ISUP loopback trunk. The point at which a trunk originates from a switching system is referred to as a near endpoint, and the point at which a trunk terminates at a switching system is referred to as a far endpoint.

FIG. 1 shows the external interfaces of a prior art switching system. Switching system 100 is connected to user terminals 115, 136, and 138 via customer lines 114, 135, and 137 respectively. User terminal 115 is a standard plain ordinary telephone service (POTS) telephone, user terminal 136 is a fax machine, and user terminal 138 is an ISDN terminal that includes a video machine and a POTS telephone.

Switching system 100 interfaces with ISUP loopback trunks 110 and ISUP inter-office trunks 111. ISUP loopback trunks 110 originate from and terminate at switching system 100. ISUP inter-office trunks 111 connect switching system 100 to switching system 150. Switching system 100 has a plurality of digital trunk controllers which interface with ISUP loopback trunks 110 and ISUP inter-office trunks 111. Signaling links 112 connect switching system 100 to SS7 network 113. Switching system 100 has a plurality of signaling terminals which interface with signaling links 112.

Switching system 150 is connected to user terminals 160, 170 and 180 via customer lines 155, 165 and 175 respectively. User terminal 160 is a standard plain ordinary telephone service (POTS) telephone, user terminal 170 is an ISDN terminal that includes a video machine and a POTS telephone, and user terminal 180 is a desktop computer system.

Switching system 150 has a plurality of digital trunk controllers which interface with ISUP inter-office trunks 111. Signaling links 140 connect switching system 150 to SS7 network 113. Switching system 150 has a plurality of signaling terminals which interface with signaling links 140.

Switching system 100 processes ISUP signaling messages 120 which are associated with ISUP inter-office trunks 111 and routes them to and from signaling links 112. Because the far endpoints of ISUP inter-office trunks 111 terminate at switching system 150, ISUP signaling messages 120 travel through the SS7 network 113 and arrive at switching system 150.

Switching system 100 also processes ISUP signaling messages 130 which are associated with ISUP loopback trunks 110 and routes them to signaling links 112. Because the far endpoints of ISUP loopback trunks 110 terminate at switching system 100, ISUP messages associated with ISUP loopback trunks 110 travel through SS7 network 113 and arrive back at switching system 100.

Routing ISUP signaling messages associated with ISUP loopback trunks to the SS7 network presents a unique challenge for switching systems because a switching system cannot use a single point code to identify itself as both the source and the destination when routing these messages. Specifically, most switching systems detect and disallow circular routing of signaling messages to the SS7 network (i.e., the source and destination being the same SSP). To get around this problem, telephone service providers must assign an additional point code to each SSP. However, assigning an additional point code to each SSP creates extensive network management problems because in a communications network each SSP must be identified by a unique point code.

Furthermore, in the case of ISUP loopback trunks, ISUP signaling messages must be processed by the MTP layer of the SS7 protocol in switching system signaling terminals, even though the source and the destination of the messages are the same. The main purpose of the MTP layer is to provide reliable transport for signaling messages within the SS7 network, and thus, it is unnecessary for a switching system to send these messages to the SS7 network when they are destined for that same switching system.

To take advantage of the advanced services of the MTP layer, telephone service providers must allocate the resources of switching system signaling terminals to ISUP loopback trunks as well as ISUP inter-office trunks. In the case of ISUP loopback trunks, the MTP layer processing associated with ISUP signaling messages in signaling terminals is an unnecessary overhead because the source and the destination for ISUP messages in the SS7 network are the same. Consequently, there has been a long felt need in the industry for a switching system that would eliminate the routing of ISUP signaling messages associated with ISUP loopback trunks to the SS7 network.

One known solution is to hardwire the ports of switching system signaling terminals together so that ISUP signaling messages associated with ISUP loopback trunks are routed from one signaling terminal to another within the switching system. While this solution eliminates transmission of ISUP signaling messages to the SS7 network by looping together signaling terminals, it has several disadvantages. Most notably, telephone service providers must still allocate the resources of signaling terminals to ISUP loopback trunks, and thus, increasing switching system costs. Furthermore, telephone service providers must assign an additional point code to each SSP. Moreover, the MTP layer processing associated with ISUP signaling messages is not eliminated. Finally, hardwiring of signaling terminals requires manual intervention by switching office technicians to pre-allocate signaling terminal ports to ISUP loopback trunks, and thus, increasing operational costs.

Another known solution is to process and route the ISUP signaling messages associated with ISUP loopback trunks within a switching system, thus, eliminating the processing of these messages in switching system signaling terminals. This solution also has several drawbacks. In particular, it uses a proprietary intra-switch messaging protocol which routes ISUP messages within the switching system to the far endpoint trunks. However, because of the rising demand in the industry for an open interface for communication among switching systems in the network, a proprietary messaging protocol would make it more difficult for telephone service providers to integrate such switching systems into their networks.

Therefore, it is desirable to provide a method and a system for processing ISUP signaling messages associated with ISUP loopback trunks within a switching system using an open standard protocol that supports all of the services of the ISUP layer of the SS7 protocol, eliminates the use of signaling terminals for these types of trunks and reduces SS7 network congestion, switching system costs and operational costs.

DISCLOSURE OF THE INVENTION

The present invention is directed to a method and an apparatus for processing ISUP signaling messages associated with loopback trunks within a switching system using an open standard that supports all of the services of the ISUP layer of the SS7 protocol. Because ISUP messages are routed within the switching system, telephone service providers need not purchase additional signaling terminal hardware and software to support the signaling traffic associated with loopback trunks, thereby reducing costs. Moreover, depending upon the configuration of the switching system, the number of ISUP signaling messages in the SS7 network, and thus network congestion, can be reduced. Furthermore, to support ISUP signaling, telephone service providers can assign a single point code to each SSP, thereby eliminating network management problems associated with the assignment of multiple point codes. Finally, because the processing associated with the MTP layer of the SS7 protocol is eliminated, the performance of ISUP signaling is enhanced for ISUP loopback trunks.

Specifically, the present invention comprises a method for processing within a switching system ISUP signaling messages associated with an ISUP loopback trunk by provisioning the ISUP loopback trunk, identifying the ISUP signaling messages associated with the ISUP loopback trunk, and routing the identified ISUP signaling messages within the switching system to the far endpoint of the ISUP loopback trunk using layers 1, 2 and 3 of Open System Interconnection (OSI) protocol.

This invention further comprises a communications network that includes a first and a second switching system, a first trunk interconnecting the first switching system to the second switching system, a second ISUP trunk with two endpoints that originate from and terminate at the first switching system, where the first switching system has means for identifying the ISUP signaling messages that are associated with the second ISUP trunk, and means for routing the identified ISUP signaling messages to the far endpoint of the second ISUP trunk using layers 1, 2 and 3 of the OSI protocol.

The invention further comprises a computer-readable medium capable of configuring a switching system to perform a method of processing ISUP signaling messages within the switching system. The method includes the steps of provisioning an ISUP loopback trunk that has two endpoints which originate from and terminate at the switching system, identifying the ISUP signaling messages that are associated with the ISUP trunk, and routing the identified ISUP signaling messages to the far endpoint of the ISUP loopback trunk using layers 1, 2 and 3 of the OSI protocol.

The summary and the following detailed description should not restrict the scope of the claimed invention. Both provide examples and explanations to enable others to practice the invention. The accompanying drawings, which form part of the detailed description, show several embodiments of the invention, and together with the description, explain the principles of the invention.

BEST MODE FOR CARRYING OUT THE INVENTION

The following description of embodiments of this invention refers to the accompanying drawings. Where appropriate, the same reference numbers in different drawings refer to the same or similar elements.

Figure 1:
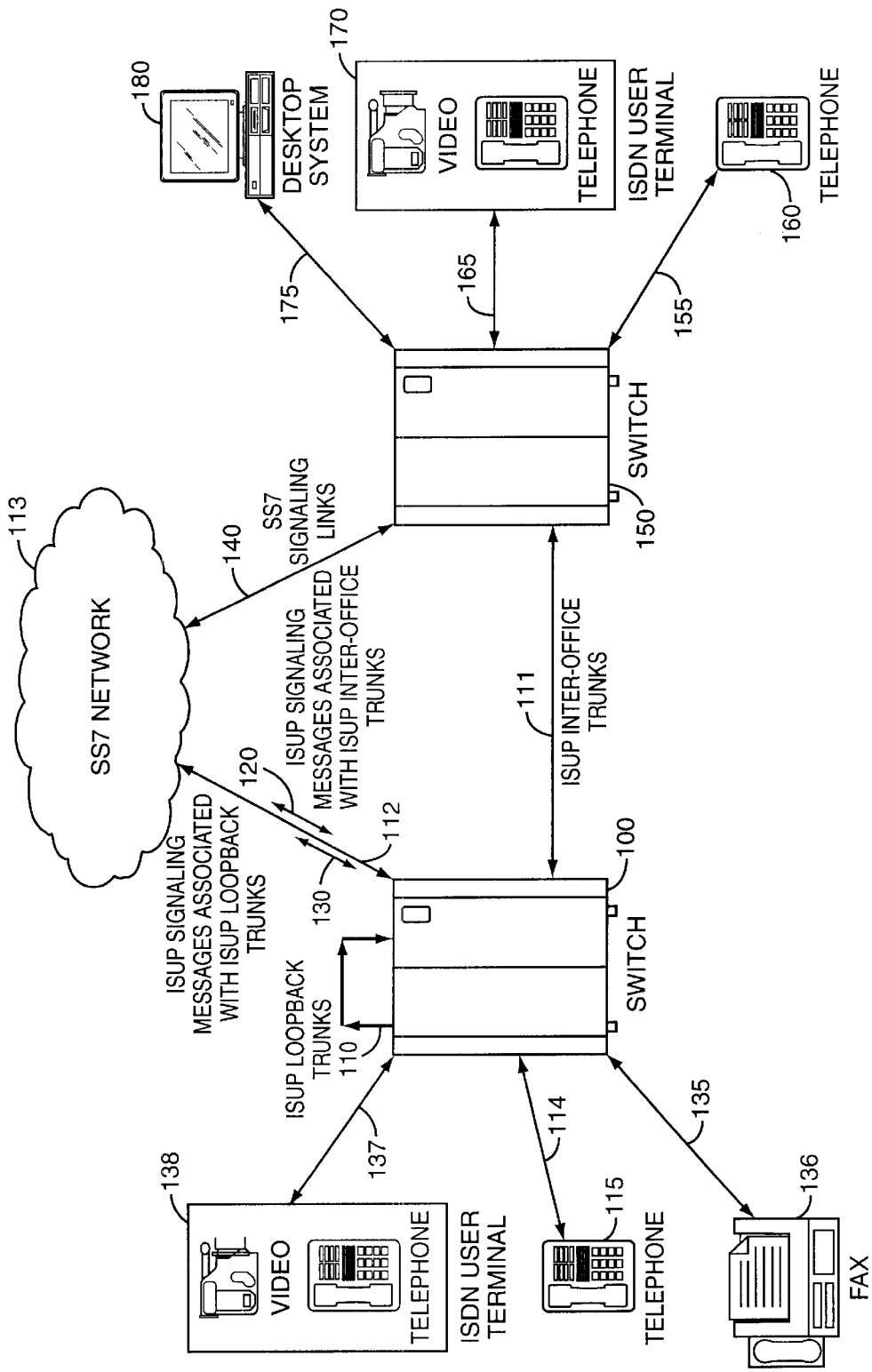
FIG. 1 is a block diagram of external interfaces of a prior art switching system.
Figure 2:
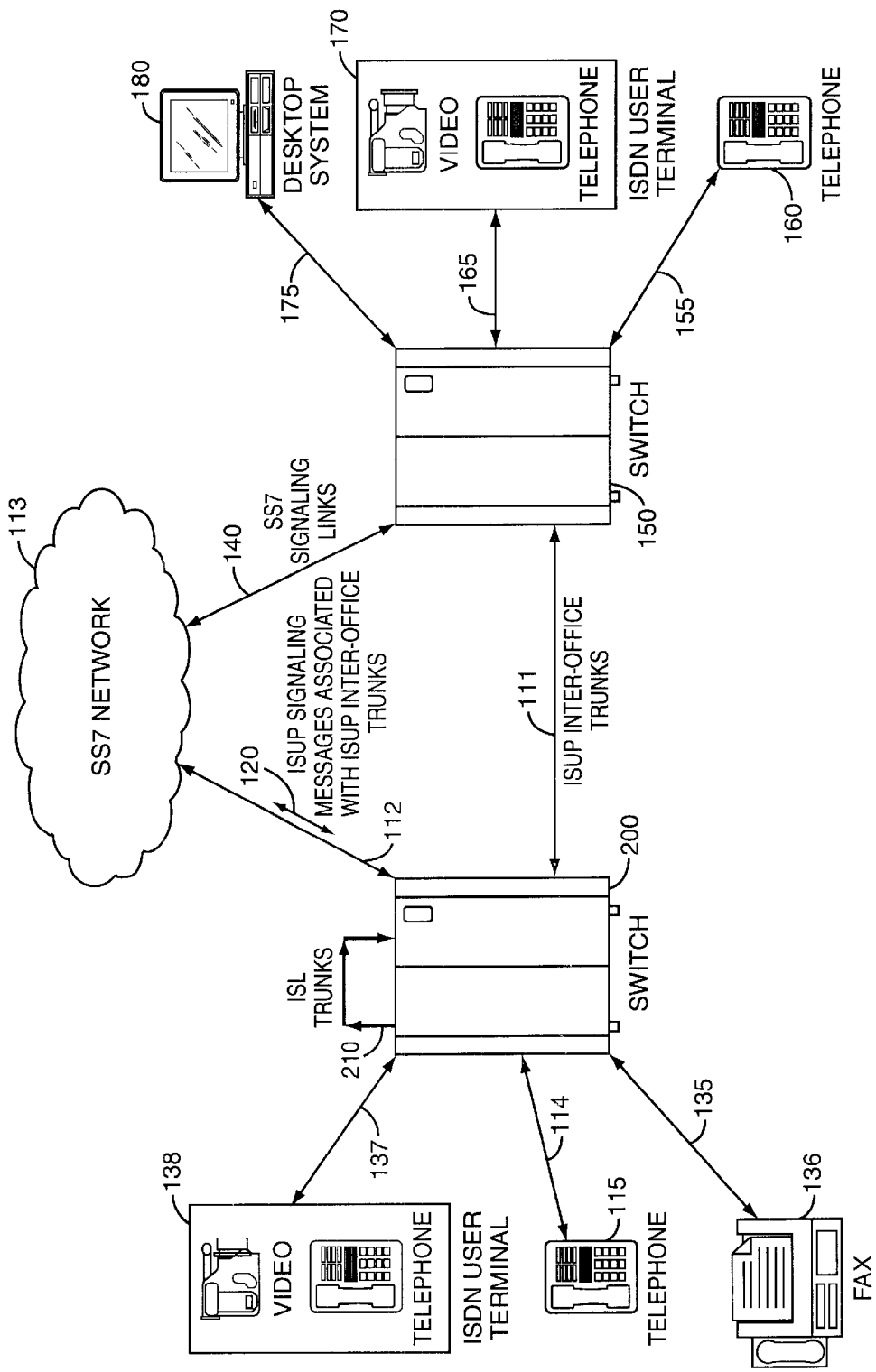
FIG. 2 is a block diagram of external interfaces of a switching system consistent with the invention.

FIG. 2 shows the external interfaces of a switching system in accordance with one embodiment of the invention. As an illustration, switching system 200 is connected to user terminals 115, 136, and 138 via customer lines 114, 135, and 137 respectively. User terminal 115 is a standard plain ordinary telephone service (POTS) telephone, user terminal 136 is a fax machine, and user terminal 138 is an ISDN terminal that includes a video machine and a POTS telephone.

An ISUP loopback trunk that uses an ISUP signaling method consistent with this invention is hereinafter referred to as an ISL trunk. Switching system 200 has a plurality of digital trunk controllers (not shown) which interface with ISL trunks 210 and ISUP inter-office trunks 111. ISL trunks 210 originate from and terminate at switching system 200. ISL trunks 210 comprise trunks 210a, 210b, and 210c shown in FIG. 3.

ISUP inter-office trunks connect switching system 200 to switching system 150. Signaling links 112 connect switching system 200 to SS7 network 113. ISUP inter-office trunks comprise trunks 111a and 111b shown in FIG. 3. Switching system 200 has a plurality of signaling terminals (not shown) which interface with signaling links 112.

Switching system 150 is connected to user terminals 160, 170 and 180 via customer lines 155, 165, and 175 respectively. User terminal 160 is a standard plain ordinary telephone service (POTS) telephone, user terminal 170 is an ISDN terminal that includes a video machine and a POTS telephone, and user terminal 180 is a desktop computer system.

Switching system 150 has a plurality of digital trunk controllers (not shown) which interface with ISUP inter-office trunks 111. Signaling links 140 connect switching system 150 to SS7 network 113. Switching system 150 has a plurality of signaling terminals (not shown) which interface with signaling links 140.

Switching system 200 processes and routes calls destined for switching system 150 to ISUP inter-office trunks 111. Switching system 200 processes ISUP signaling messages 120 associated with those calls and routes them to signaling links 112. ISUP signaling messages 120 travel through the SS7 network 113 and arrive at switching system 150.

Switching system 200 processes and routes calls associated with ISL trunks 210. Switching system 200 processes ISUP signaling messages associated with those calls internally within the switching system using layers 1, 2, and 3 of the OSI protocol. In other words, the ISUP signaling messages associated with these calls are not routed to the SS7 network 113.

Figure 3:
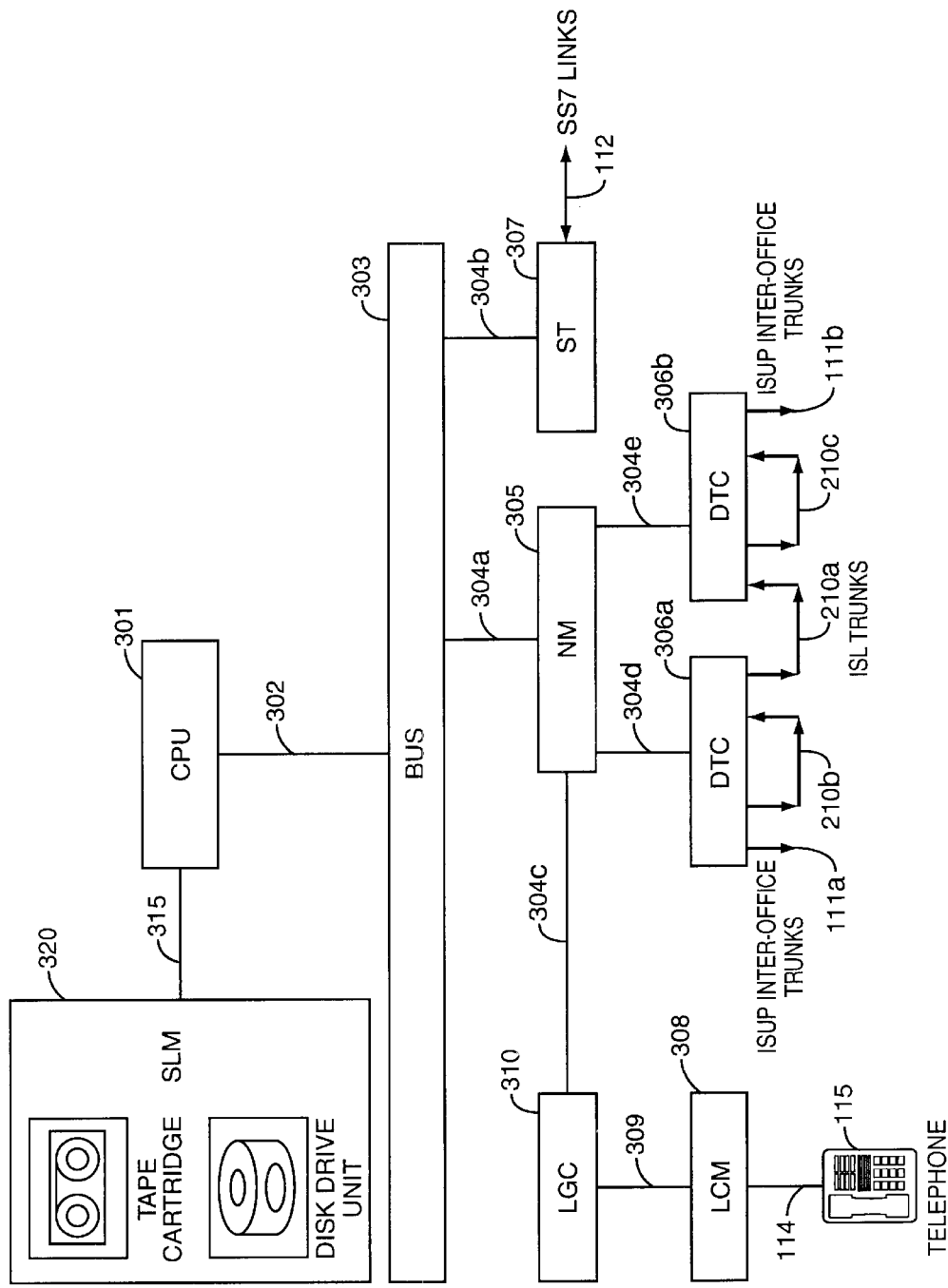
FIG. 3 is a block diagram of components of a switching system consistent with the invention.

Although the present invention is not limited to a particular switching system hardware and/or software architecture, for illustrative purposes, FIG. 3 shows the main components of switching system 200. Switching system 200 preferably includes Central Processing Unit 301 (CPU), Bus 303, Network Module 305 (NM), Digital Trunk Controllers (DTC) 306a and 306b, Signaling Terminal 307 (ST), Line Concentrating Module 308 (LCM), Line Group Controller 310 (LGC), and System Load Module 320 (SLM). Bus 303 allows CPU 301 to communicate with each NM 305, DTCs 306a and 306b, ST 307, LCM 308, and LGC 310 using inter-process messages. Each of CPU 301, NM 305, DTCs 306a and 306b, ST 307, LCM 308, and LGC 310 is assigned a unique node number. When dispatching an inter-process message, the source and destination of the message within switching system 200 are identified by a node number.

DTC 306a interfaces with ISL trunks 210a, 210b, and ISUP inter-office trunks 111a. ISL trunk 210a originates from DTC 306a and terminates at DTC 306b. ISL trunk 210b originates from and terminates at DTC 306a.

DTC 306b interfaces with ISL trunks 210a, 210c, and ISUP inter-office trunks 111b. ISL trunk 210c originate from and terminate at DTC 306b.

ST 307 interfaces with SS7 signaling links 112 which connect switching system 200 to SS7 network 113. LCM 308 interfaces with customer lines 114 which are connected to switching system 200 as well.

Link 302 connects CPU 301 to Bus 303. Link 302 may comprise a fiber optic link, where each fiber carries 512 channels. Links 304a and 304b connect Bus 303 to NM 305 and ST 307, respectively. Link 304c connects LGC 310 to NM 305. Links 304d and 304e connect Network Module to DTCs 306a and 306b respectively. Links 304a, 304b, 304c, 304d and 304e may each comprise a four-wire copper cable carrying 30 standard channels and two message channels. Link 309 connects LCM 308 to LGC 310. Link 309 may comprise an eight-wire cable carrying 32 channels.

CPU 301 includes a plurality of circuit cards which include central processing unit circuit cards, memory cards, and bus cards. These cards are connected to each other via a bus interconnection. Each central processing unit card includes a microprocessor. Each memory card stores CPU software and data. Each bus card connects a central processing unit card to Bus 303.

Some of the basic tasks performed by CPU 301 include setting up, managing, and terminating a call in switching system 200. Specifically, these tasks include the steps of creating a logical representation of the originator of the call in the switching system, collecting the digits dialed by the originator, loading the dialed digits into a call processing data structure, translating the dialed digits to determine the destination of the call, determining where and how to make a connection with the destination, instructing DTCs 306a and 306b, ST 307 and LCM 308 on supervision of lines, trunks, and signaling links and creating a logical representation of the destination in switching system 200. While CPU 301 also preferably performs trunk and line maintenance and provisioning tasks, it preferably delegates many of the lower level tasks to DTCs 306a and 306b, ST 307, and LCM 308.

When the above identified call processing steps are directed to an ISUP trunk, CPU 301 and DTCs 306a and 306b use ISUP signaling messages to communicate to the originator and/or the destination information relating to the setup, management, and termination of a call. In a preferred embodiment, the process of building, formatting, and decoding ISUP signaling messages may be distributed among CPU 301 and DTCs 306a and 306b, although the extent of this distribution may vary depending on the particular switching system architecture.

Bus 303 preferably comprises two message switches which operate in a load-sharing mode. Specifically, each message switch comprises a processor unit, memory unit and a clock which are connected to each other by a processor bus (P-bus). A transaction bus (T-bus) transports messages to links 304a and 304b. Each memory unit stores message switch software and data.

DTCs 306a and 306b preferably each comprise a master processor unit, a signaling processor unit, master processor memory unit, signaling processor memory unit, digital trunk interface cards, internal link interface cards and a time switch unit. The master processor unit and signaling processor unit each use a microprocessor. The master processor unit performs call processing functions which include digit collection, channel assignment and interpretation of messages from CPU 301. The signaling processor unit controls the time switch and performs real-time bit scanning. The master processor and signaling processor memory units store DTC software and data.

Each DTC internal link interface card communicates with CPU 301 through NM 305 and Bus 303. A plurality of digital trunk interface cards interface with ISUP inter-office trunks 111a and 111b at a rate of, for example, Digital Signal-Level 1(1.544 mega bits/sec). Alternatively, a plurality of digital trunk interface cards also interface with ISL trunks 210a, 210b, and 210c at a rate of, for example, Digital Signal-Level 1. The time switch unit maps external connections of the switching system 200 from, for example trunks 111a or 111b, to logical connections within the switching system.

ST 307 interfaces with external SS7 links 112 preferably using layers 1, 2, and 3 of the SS7 protocol. Alternatively, ST 307 may interface with external SS7 links 112 using only layers 1 and 2 of the SS7 network. All ISUP signaling messages coming from and going to the SS7 signaling network pass through ST 307.

NM 305 comprises a time-division multiplexed switching matrix that is controlled by a controller. NM 305 may preferably include up to 64 c-side (i.e., in the direction of CPU 301) ports and 64 p-side (i.e., in the direction of peripheral modules) ports. The c-side ports are used to interconnect multiple NMs. The p-side ports are connected to DTC 306 and LGC 310. NM 305 connects DTC 306 and LGC 310 by way of a switched link, processes Pulse Coded Modulation (PCM) signals, inserts outgoing control messages directed to DTCs 306a and 306b and LGC 310 and extracts incoming messages from DTC 306a and 306b and LGC 310.

LCM 308 interfaces with analog lines, for example customer lines 114, and provides low-level functions such as line scanning and ringing. Link 309 connects a group of LCMs to LGC 310.

LGC 310 performs call coordination and provides dial tones. LGC 310 comprises a master processor unit, signaling processor unit, master processor memory unit, signaling processor memory unit, power converter, internal link interface cards and a time switch unit. The master processor unit and signaling processor unit each use a microprocessor. The master processor unit performs call processing functions which include digit collection, channel assignment and interpretation of messages from CPU 301 and LCM 308. The signaling processor unit controls the time switch and performs real-time bit scanning. The master processor and signaling processor memory units store LGC software and data.

Each LGC internal link interface card communicates with CPU 301 through NM 305 and Bus 303. Each digital trunk interface card interfaces with ISUP external trunks at a rate of, for example, Digital Signal-Level 1. The time switch unit maps external connections of the switch from, for example, customer lines 114 into logical connections within the switching system.

SLM 320 interfaces with CPU 301 via link 315. SLM 320 preferably has a cartridge tape and disk drive unit to upload and/or download switching system software and data. From switching system 200, software and data are preferably downloaded to the disk drive unit and are then copied to a tape. From a tape which is loaded onto the cartridge, software and data are preferably copied to the disk drive unit and are then uploaded to switching system 200.

Figure 4:
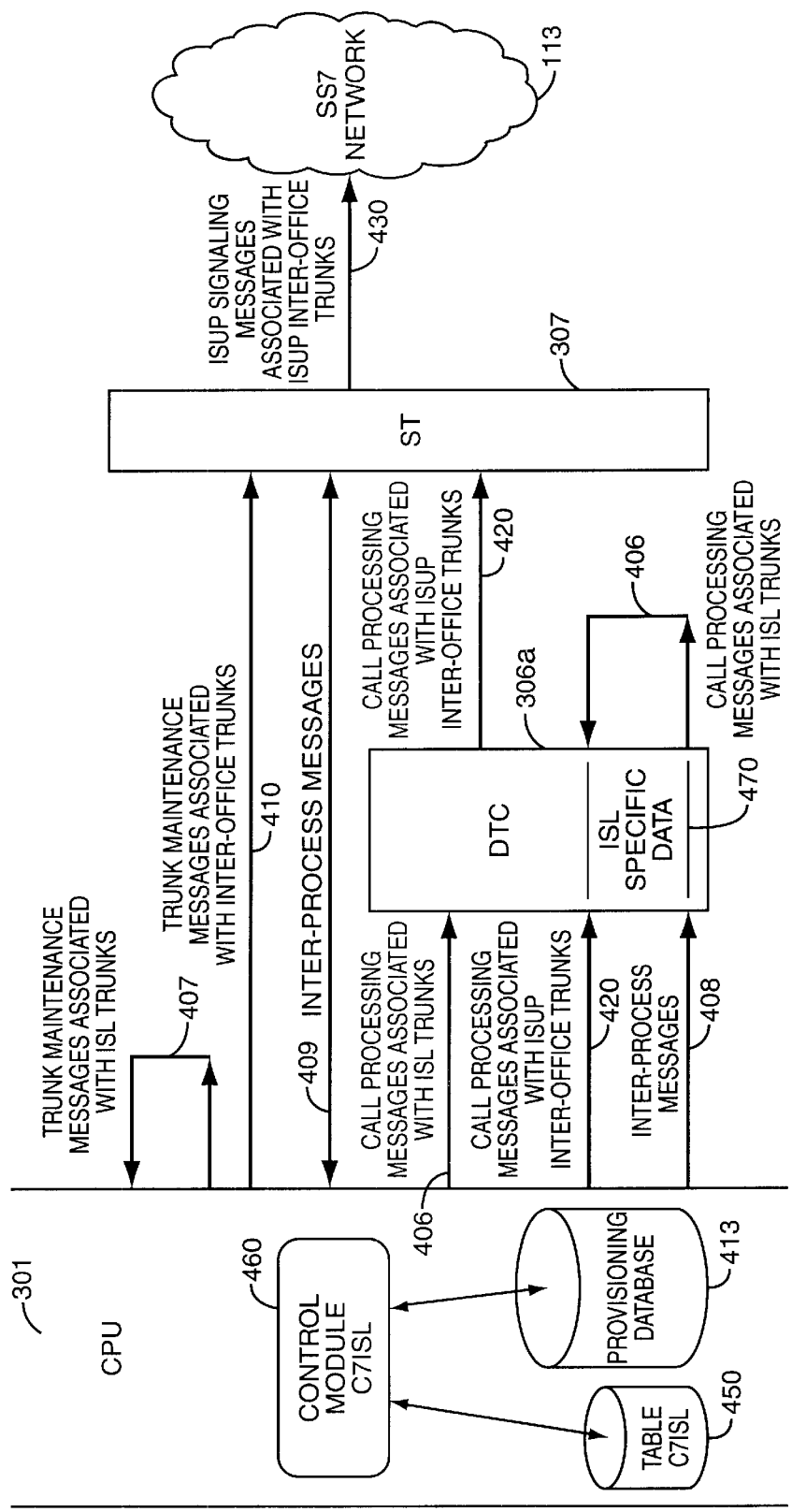
FIG. 4 is a block diagram of processing paths within a switching system for ISUP trunk maintenance messages associated with ISUP loopback trunks consistent with the invention.

FIG. 4 is a block diagram of processing paths within switching system 200 for ISUP signaling messages associated with ISL trunk 210b and ISUP inter-office trunk 111a. For simplicity, DTC 306b, Bus 303, NM 305, LCM 308, and LGC 310 are not shown. As shown, switching system 200 processes two types of ISUP signaling messages: call processing messages and trunk maintenance messages. The format of these messages are well known in the industry and are defined in GR-246-CORE, Volume 3, ANSI T1.113-1988, and ITU-T Q.761, Q.762, Q.763, Q.764 and Q.766.

For ISUP inter-office trunk 111a, CPU 301 dispatches call processing messages 420 to DTC 306a and trunk maintenance messages 410 to ST 307. DTC 306a processes call processing messages 420 and dispatches them to ST 307. ST 307 then routes call processing messages 420 and trunk maintenance messages 410 to the far endpoint of ISUP inter-office trunk 111a using SS7 network 113.

For ISL trunk 210b, CPU 301 generates and dispatches call processing messages 406 to DTC 306a. DTC 306a processes and routes call processing messages 406 to the far endpoint of ISL trunk 210b which terminates at DTC 306a. CPU 301 also generates and routes trunk maintenance messages 407 to the far endpoint of ISL trunk 210b using an intra-switch messaging protocol which is preferably fully compliant with layers 1, 2 and 3 of the OSI protocol.

Provisioning ISL Trunks

ISL trunks 210a, 210b, and 210c must be provisioned within switching system 200 so that switching system 200 can distinguish these trunks from ISUP inter-office trunks 111a and 111b. Although ISL trunks 210a, 210b, and 210c and ISUP inter-office trunks 111a and 111b are provisioned in provisioning database 413 shown in FIG. 4, the endpoints of each ISL trunk (210a, 210b, and 210c) must be further defined within switching system 200. This additional information may preferably be stored in table C7ISL 450. Table C7ISL 450 includes two fields, ENDPT1 and ENDPT2, where each field represents an endpoint of an ISL trunk.

After the two endpoints of an ISL trunk, for example ISL trunk 210a, are properly defined in table C7ISL, CPU 301 dispatches inter-process message 408 to DTCs 306a and 306b and dispatches inter-process message 409 to ST 307.

Inter-process message 409 requests ST 307 to delete from its internal tables all records relating to ISL trunk 210a. Because ISL trunk 210a originates from and terminates at switching system 200, all signaling messages associated with ISL trunk 210a are preferably generated and processed within switching system 200. As a result, once all records relating to ISL trunk 210a are deleted from ST 307 internal tables, ST 307 preferably rejects all signaling messages from SS7 network 113 that are associated with ISL trunk 210a with the exception of circuit query messages.

It is possible that another switching system, for example switching system 150, erroneously sends a circuit query message, which uses the circuit identification code (CIC) for ISL trunk 210a, through SS7 network 113 to switching system 200. A circuit identification code identifies a circuit such as a trunk in a communications network. The format of a circuit query message and circuit identification codes are well known in the industry and are defined in GR-246-CORE, Volume 3, ANSI T1.113-1988, and ITU-T Q.761, Q.762, Q.763, Q.764 and Q.766.

In response to the circuit query message associated with ISL trunk 210a, ST 307 preferably dispatches via inter-process message 409 the circuit query message to CPU 301. CPU 301 determines that ISL trunk 210a is an ISL trunk and dispatches inter-process message 409 back to ST 307, requesting ST 307 to notify the originator of the circuit query message that ISL trunk 210a is unequipped. ST 307 then sends an ISUP signaling message to switching system 150, notifying it that ISL trunk 210a is unequipped.

As indicated above, CPU 301 also dispatches inter-process message 408 to DTCs 306a and 306b. Inter-process message 408 includes certain ISL specific data 470 associated with ISL trunk 210a which DTC 306a and 306b preferably store in their respective static memory. ISL specific data 470 includes an ISL boolean field and a terminal identifier (TID) field. The ISL boolean indicates whether, for example, ISL trunk 210a uses ISUP signaling consistent with this invention. TID comprises a node number and a terminal number. The node number identifies DTC 306a or 306b as a specific node within switching system 200. The terminal number logically represents the far endpoint hardware entity for ISL trunk 210a within switching system 200.

Figure 5:
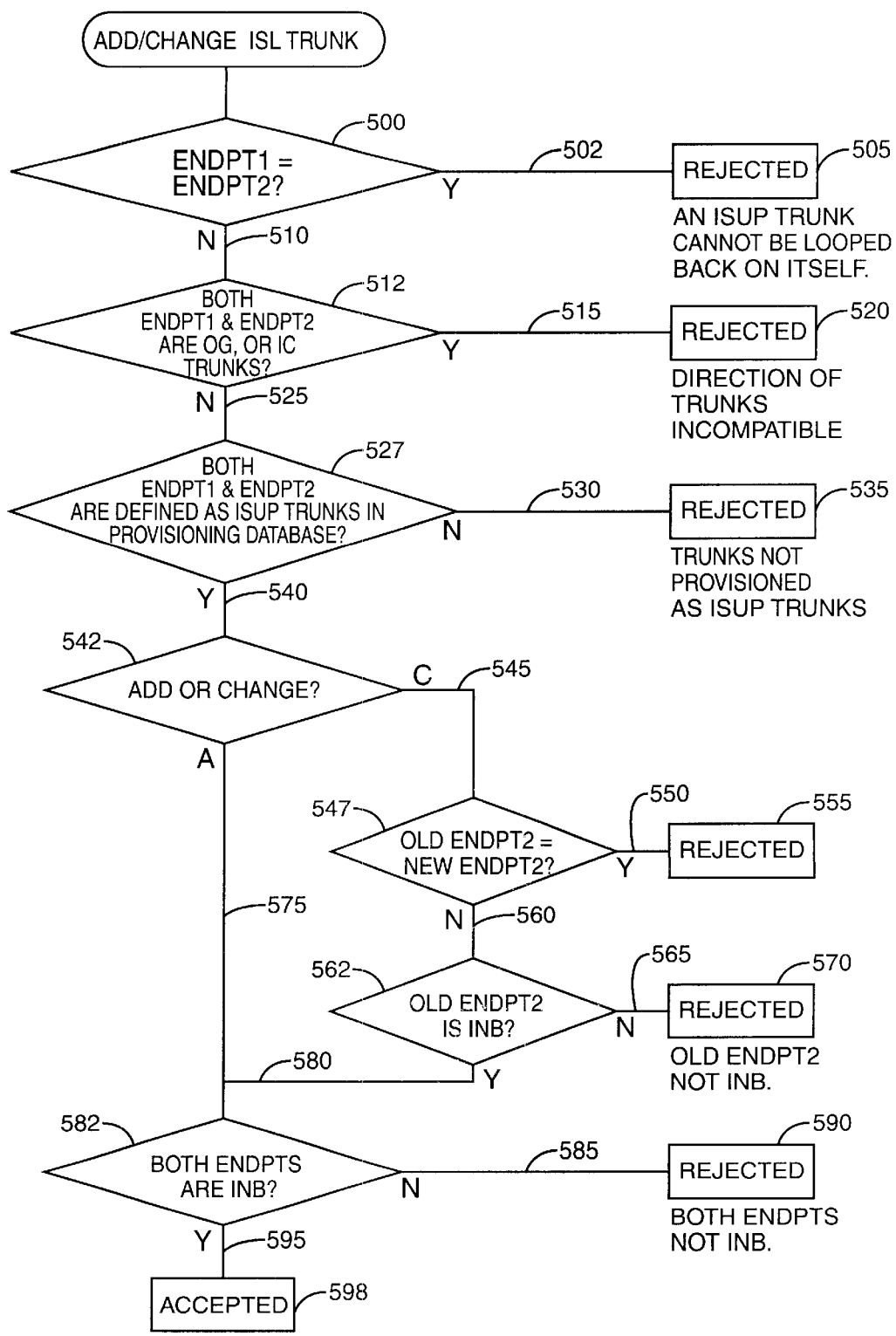
FIG. 5 is a flow chart of verification steps in a control module for adding or changing an ISUP loopback trunk consistent with the invention.

CPU 301 preferably comprises control module C7ISL 460 which verifies user requests to add, delete, and/or change ISL trunks in table C7ISL 450. FIG. 5 is a flow chart of the steps taken by control module C7ISL when verifying a user request to add or change an ISL trunk. As shown, control module C7ISL 460 determines whether ENDPT1 and ENDPT2 of an ISL trunk are the same (step 500). If ENDPT1 and ENDPT2 are the same (step 502), then control module C7ISL 460 rejects a request to add or change the trunk (step 505). If ENDPT1 and ENDPT2 are not the same (step 510), then control module C7ISL 460 determines whether ENDPT1 and ENDPT2 are defined as both outgoing (OG) or as both incoming (IC) (step 512).

If ENDPT1 and ENDPT2 are defined as both OG or as both IC (step 515), then control module C7ISL 460 rejects a request to add or change the trunk (step 520). If ENDPT1 and ENDPT2 are not defined as both OG or as both IC (step 525), then control module C7ISL 460 determines whether ENDPT1 and ENDPT2 are defined as ISUP trunks in provisioning database 413 (step 527).

If ENDPT1 and ENDPT2 are not defined as ISUP trunks in provisioning database 413 of the switching system (step 530), then control module C7ISL 460 rejects a request to add or change the trunk (step 535). If ENDPT1 and ENDPT2 of the trunk are defined in provisioning database 413 of the switching system (step 540), then control module C7ISL 460 determines whether a request is to add or change the ISL trunk (step 542).

If the request is to add the ISL trunk (step 575), then control module C7ISL 460 determines whether ENDPT1 and ENDPT2 are in Installation Busy state (INB) (step 582). If ENDPT1 and ENDPT2 are in INB state (step 595), then control module C7ISL 460 accepts the request to add the ISL trunk to table C7ISL (step 598). If ENDPT1 or ENDPT2 is not in INB state (step 585), control module C7ISL 460 rejects the request to add the ISL trunk (step 590).

If the request is to change the ISL trunk (step 545), then control module C7ISL 460 determines whether old ENDPT2 is equal to new ENDPT2 (step 547). If old ENDPT2 is the same as the new ENDPT2 (step 550), then control module C7ISL 460 rejects the request to change the trunk (step 555). If the old ENDPT2 is not the same as the new ENDPT2 (step 560), then control module C7ISL 460 determines whether old ENDPT2 is in INB state (step 562).

If old ENDPT2 is not in INB state (565), then control module C7ISL 460 rejects the request to change the ISL trunk (step 570). If old ENDPT2 is in INB state (580), then control module C7ISL 460 determines whether ENDPT1 and new ENDPT2 are in INB state (582). If ENDPT1 and new ENDPT2 are in INB state (step 595), then control module C7ISL 460 accepts the request to change ISL trunk in table C7ISL (step 598). If ENDPT1 or new ENDPT2 are not in INB state (step 585), then control module C7ISL 460 rejects the request to change the trunk (step 590).

By cross-referencing against provisioning database 413, control module C7ISL assures that only ISUP trunks that are suitable for use as loopback trunks are populated in table C7ISL 450.

Figure 6:
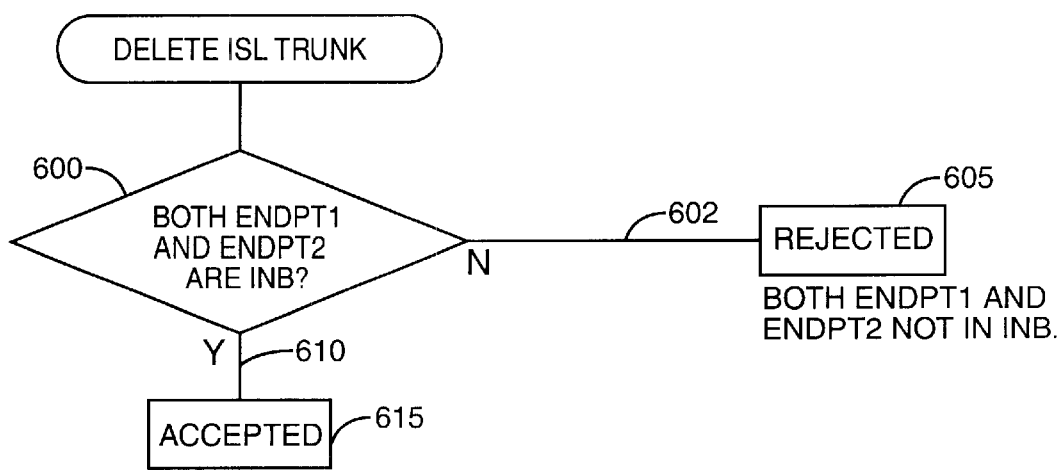
FIG. 6 is a flow chart of verification steps in a control module for deleting an ISUP loopback trunk consistent with the invention.

FIG. 6 is a flow chart of the steps taken by control module C7ISL 460 when verifying a user request to delete an ISL trunk. As shown, control module C7ISL 460 determines whether ENDPT1 and ENDPT2 are in INB state (step 600). If ENDPT1 or ENDPT2 of the trunk are not in INB state (step 602), then control module C7ISL 460 rejects the request to delete the trunk in table C7ISL (step 605). If ENDPT1 and ENDPT2 are in INB state (step 610), the control module C7ISL 460 accepts the request to delete the trunk from table C7ISL (step 615).

Trunk Maintenance

As shown in FIG. 4, CPU 301 dispatches trunk maintenance messages 410 associated with ISUP inter-office trunks 111a and 111b to ST 307 but routes trunk maintenance messages 407 associated with ISL trunks 210a, 210b, and 210c to the far endpoints of these trunks by using an intra-switch messaging protocol that is preferably fully compliant with layers 1, 2 and 3 of the OSI protocol.

Figure 8:
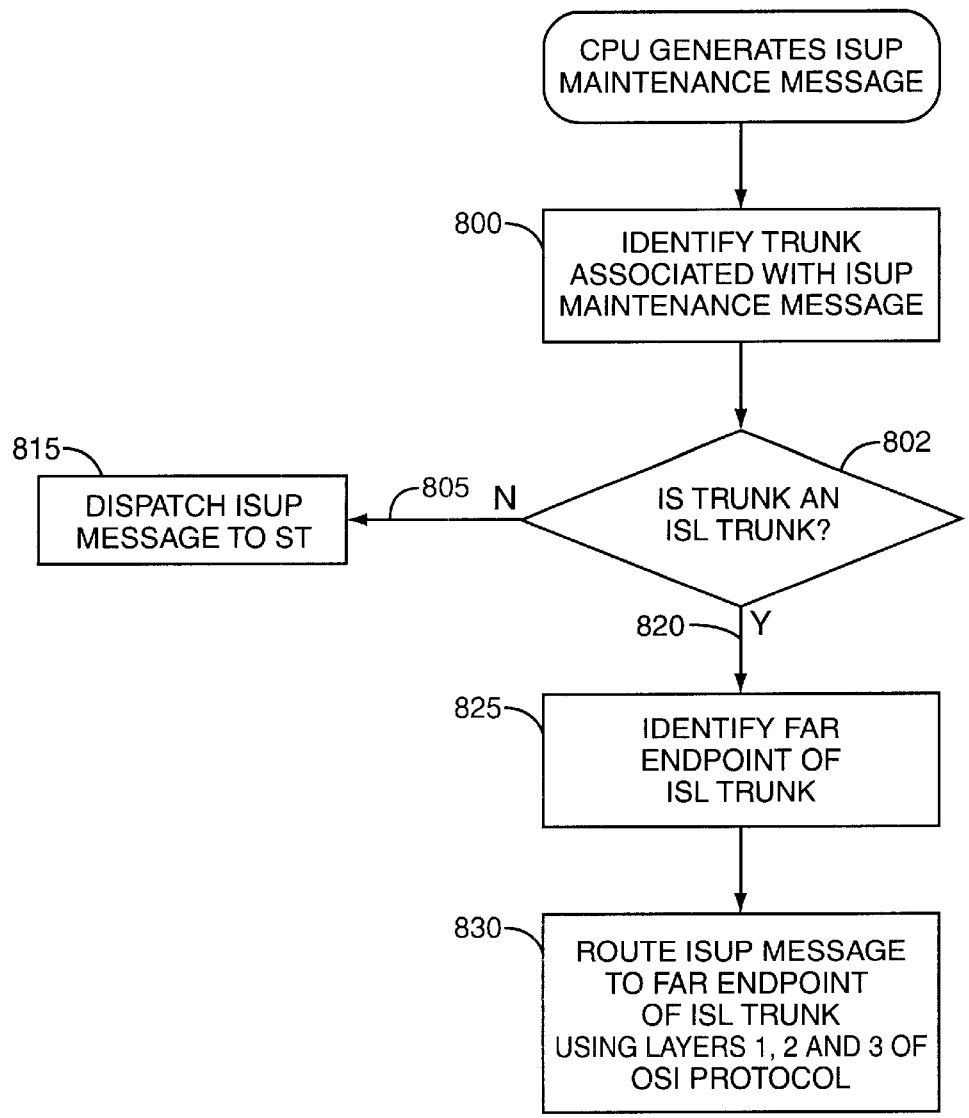
FIG. 8 is a flow chart of the steps for processing ISUP trunk maintenance messages associated with ISUP loopback trunks consistent with the invention.

FIG. 8 is a flow chart of the steps performed by CPU 301 when processing trunk maintenance messages 407 and 410. For each trunk maintenance message 407 and 410, CPU 301 identifies the ISUP trunk associated with the message (step 800). For each identified ISUP trunk, CPU 301 then determines whether the identified ISUP trunk is an ISL trunk (step 802) by checking for the presence of a record in table C7ISL for the identified ISUP trunk.

If a record for the trunk exists in table C7ISL (step 820), then CPU 301 identifies the far endpoint of the trunk (step 825). CPU 301 then routes trunk maintenance message 407 to the far endpoint trunk using an intra-switch messaging protocol which is preferably fully compliant with layers 1, 2, and 3 of the Open System Interconnection (OSI) protocol (step 830).

If a record for the trunk does not exist in table C7ISL (step 805), CPU 301 dispatches trunk maintenance message 410 to ST 307 (step 815). ST 307 then routes the message to the far endpoint trunk using SS7 network 113.

Call Processing

Figure 7:
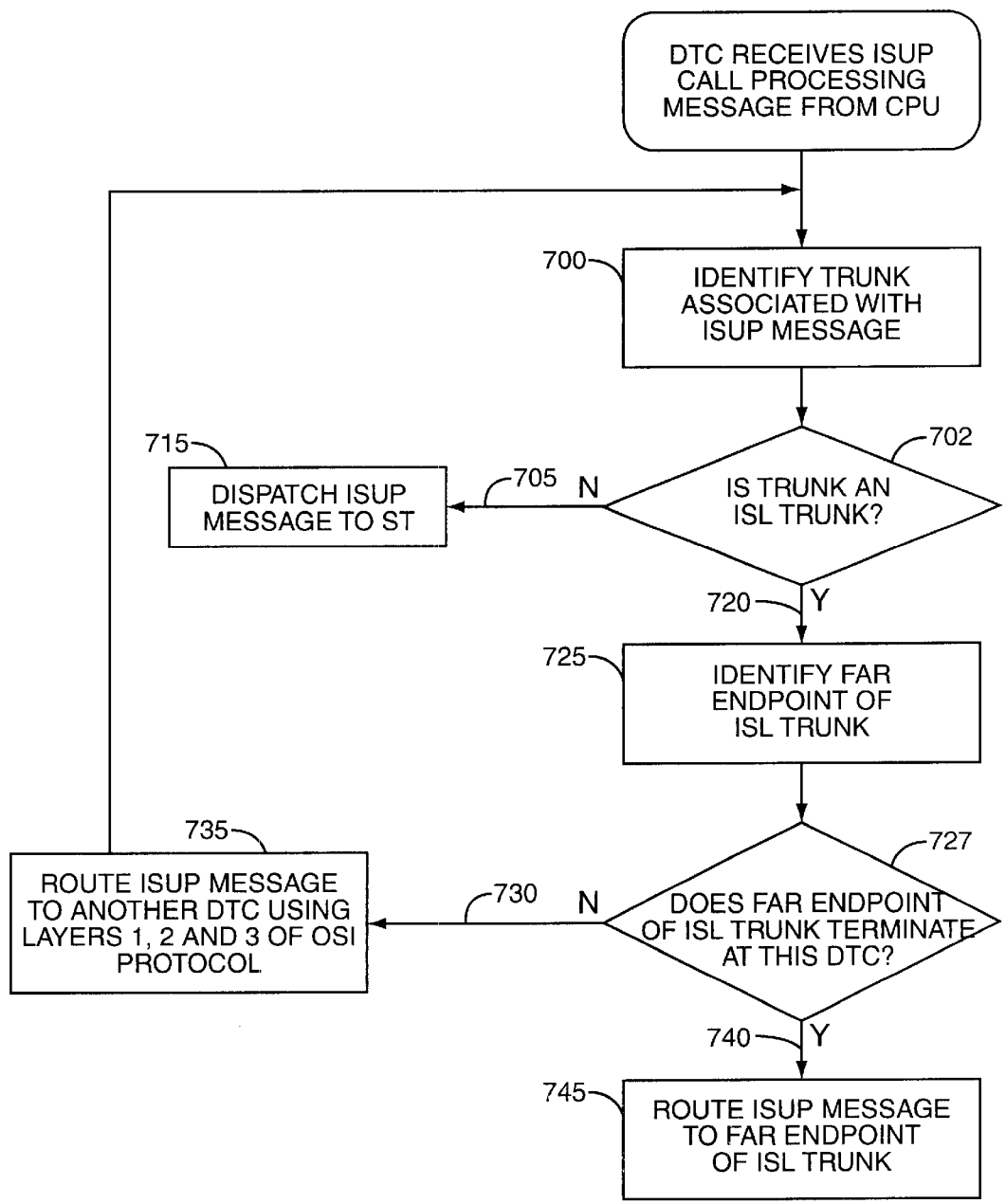
FIG. 7 is a flow chart of the steps for processing ISUP call processing messages associated with ISUP loopback trunks consistent with the invention.

FIG. 4 shows call processing messages for ISL trunk 210b which originates from and terminates at DTC 306a. CPU 301 dispatches call processing messages 406 and 420 to DTC 306a. FIG. 7 is a flow chart of the steps performed by DTC 306 to process call processing messages 406 and 420. For each of call processing messages 406 and 420, DTC 306a identifies the ISUP trunk associated with the message (step 700). For each identified ISUP trunk, DTC 306a determines whether the identified ISUP trunk is an ISL trunk (step 702) by checking the value of the ISL boolean in the ISL specific data 470 associated with the ISUP trunk.

If the value of ISL boolean is FALSE (step 705), then DTC 306a dispatches call processing message 420 to ST 307 (step 715).

If the value of ISL boolean is TRUE (step 720), DTC 306a identifies the far endpoint trunk (step 725) by retrieving the TID information associated with the ISUP trunk from the ISL specific data 470. DTC 306a then determines whether the far endpoint trunk terminates at DTC 306a (step 727) by comparing the node number for DTC 306a with the node number identified by the TID. If the node number for DTC 306a is equal to the node number identified by the TID (step 740), then DTC 306a determines that the far endpoint trunk terminates at DTC 306a. DTC 306a then routes call processing message 406 to the far endpoint of the trunk (step 745). DTC 306a then processes the ISUP message on the incoming side of the trunk as though the message came from SS7 network 113 through ST 307.

If the node number for DTC 306a is not equal to the node number identified by the TID (step 730), then DTC 306a determines that the far endpoint of the trunk terminates at a different DTC, and thus, routes call processing message 406 to the node identified by the node number, for example DTC 306b, using an intra-switch messaging protocol which is preferably fully compliant with layers 1, 2 and 3 of the OSI protocol (step 735). DTC 306b then routes call processing message 406 to the far endpoint trunk.

Figure 9:
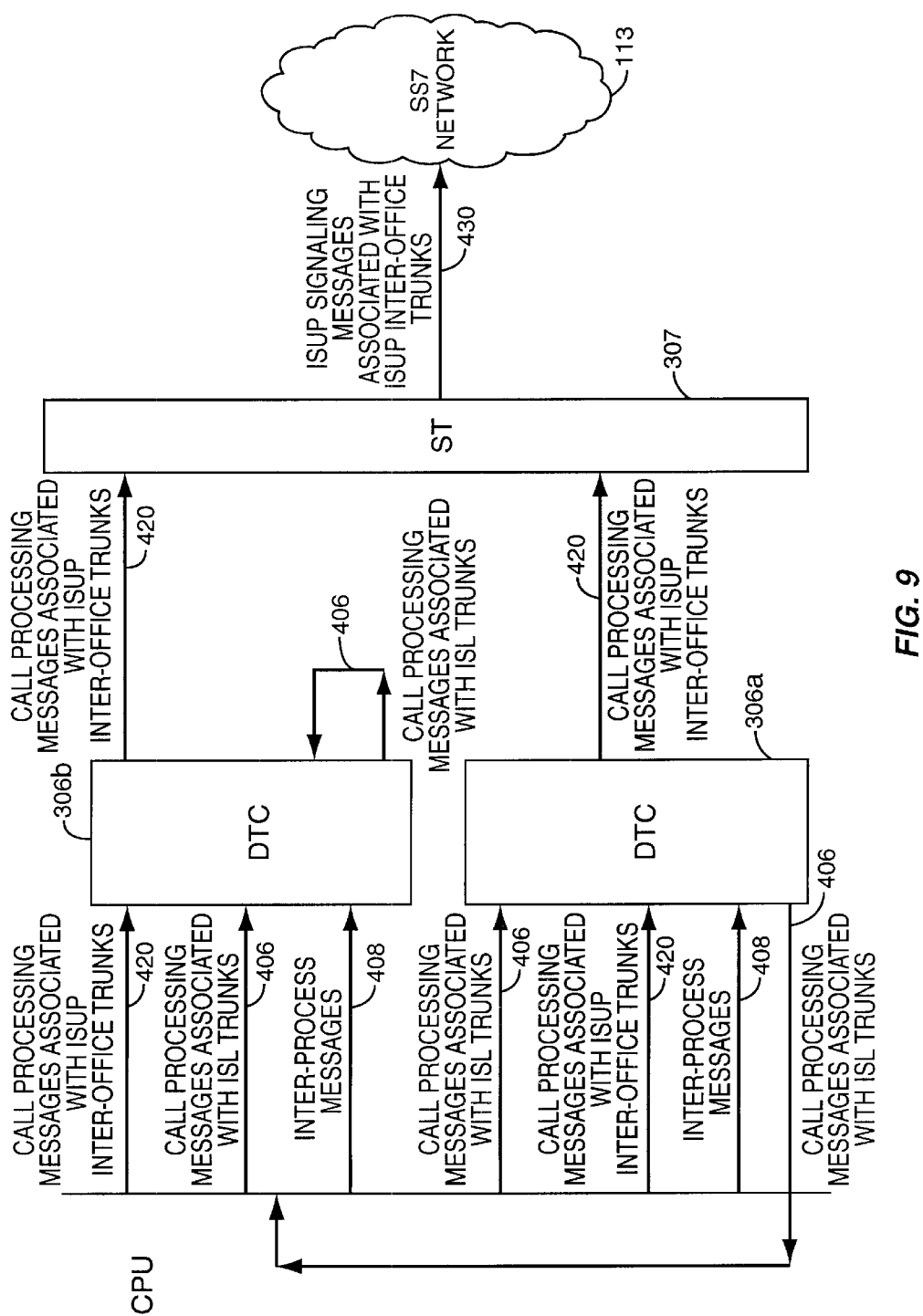
FIG. 9 is a block diagram of processing paths for ISUP call processing messages associated with ISUP loopback trunks.

As an illustration, FIG. 9 shows call processing messages 406 which DTC 306a routes within switching system 200 to DTC 306b using layers 1, 2, and 3 of the OSI protocol. As shown, CPU 301 dispatches call processing messages 406 associated with ISL trunks 210a and 210b and call processing messages 420 associated with ISUP inter-office trunk 111a to DTC 306a. CPU 301 also dispatches call processing messages 920 associated with ISUP inter-office trunk 111b to DTC 306b. DTCs 306a and 306b then dispatch call processing messages 420 and 920, which are associated with ISUP inter-office trunks 111a and 111b, to ST 307. ST 307 then routes call processing messages 420 and 920 to SS7 network 113. For simplicity, trunk maintenance messages are not shown in FIG. 9.

With respect to call processing message 406 associated with ISL trunk 210a, as described above, DTC 306a determines that the far endpoint of the trunk resides in DTC 306b. DTC 306a then routes call processing message 406 to CPU 301 using an intra-switch messaging protocol which is preferably fully compliant with layers 1, 2 and 3 of the OSI protocol. CPU 301 then routes call processing message 406 to DTC 306b using the same intra-switch messaging protocol. DTC 306b in turn processes call processing message 406 on the incoming side of the trunk as though the message came from SS7 network 113 through ST 307.

Figure 10:
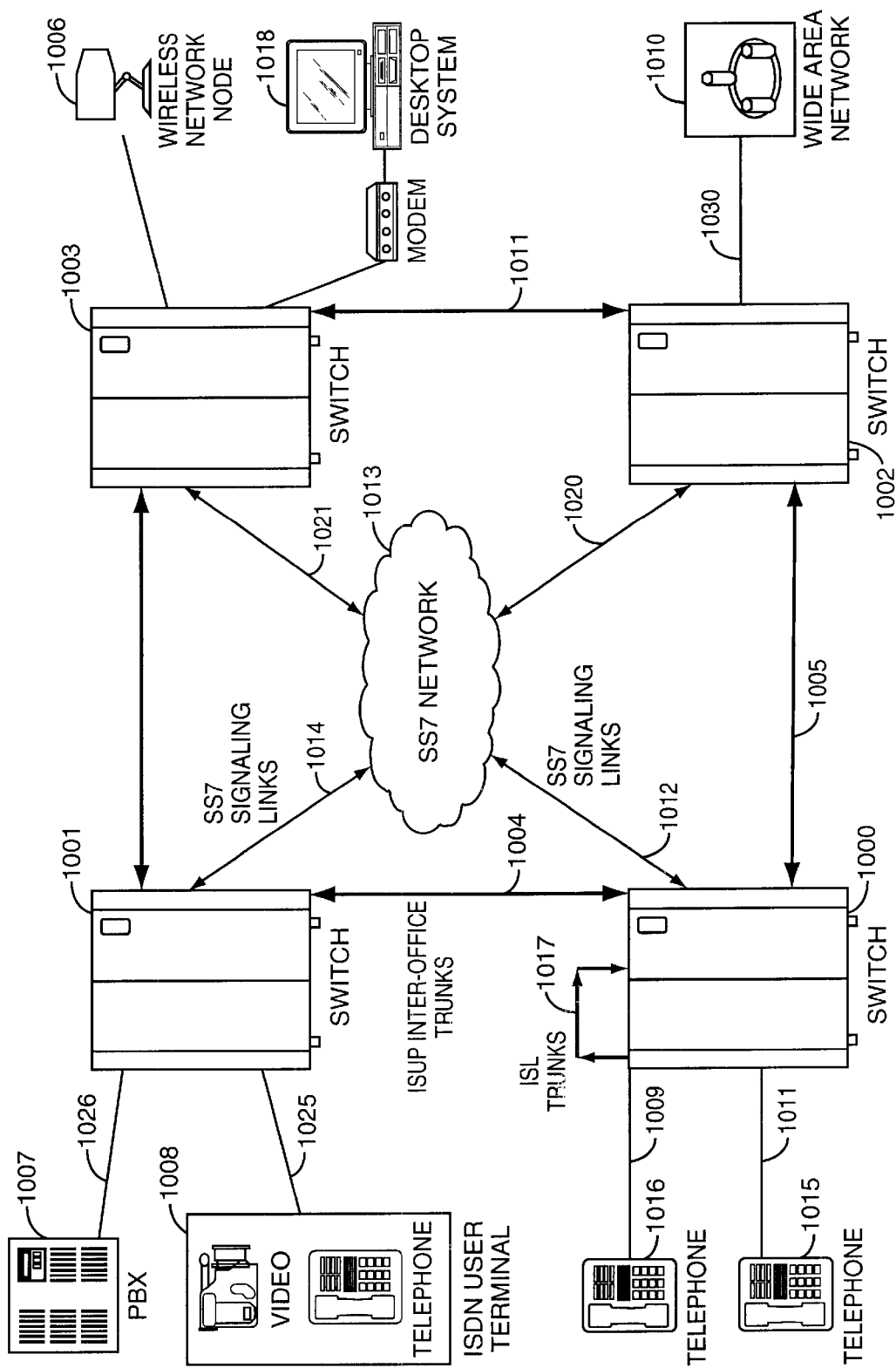
FIG. 10 is a block diagram of a communications network that includes switching systems consistent with the invention.

FIG. 10 shows a communications network which comprises switching system 1000 consistent with the present invention. Switching system 1000 has a plurality of digital trunk controllers which interface with ISL trunks 1017 and ISUP inter-office trunks 1004 and 1005. ISL trunks 1017 originate from and terminate at switching system 1000. ISUP inter-office trunks 1004 and 1005 respectively connect switching system 1000 to switching systems 1001 and 1002. Signaling links 1012, 1014, and 1020 respectively connect switching systems 1000, 1001 and 1002 to SS7 network 1013. Switching systems 1000, 1001, and 1002 each have a plurality of signaling terminals which respectively interface with signaling links 1012, 1014, and 1020.

Customer lines 1011 and 1009 respectively connect switching system 1000 to user equipment 1015 and 1016. As an illustration, user equipment 1015 and 1016 are POTS telephone sets. However, in other embodiments consistent with this invention, a user equipment may support any combination of voice, fax, data, and video and may include any combination of telephone set, fax machine, ISDN equipment, Private Branch Exchange (PBX), a computer, video equipment, a local area network, or a wide area network.

Customer line 1030 connects wide area network 1010 to switching system 1002.

Customer lines 1025 and 1026 respectively connect switching system 1001 to user equipment 1008 and 1007. User equipment 1008 is an ISDN equipment which includes a telephone set and a video equipment. User equipment 1007 is a PBX which switches a plurality of voice and data connections.

Switching system 1000 processes ISUP signaling messages and dispatches them to its digital trunk controllers. If the ISUP signaling messages are associated with ISUP inter-office trunks 1004, switching system 1000 routes them to its signaling terminals for transmission onto SS7 network 1013. If ISUP signaling messages are associated with ISL trunks 1017, switching system 1000 identifies the far endpoints of ISL trunks 1017 and routes the messages internally within the switching system to the far endpoints of ISL trunks 1017 using an intra-switch messaging protocol that is preferably fully compliant with layers 1, 2, and 3 of the Open Systems Interconnection (OSI) protocol.

Those skilled in the art will recognize that various modifications and variations can be made in the preceding examples without departing from the scope or spirit of the invention. The specification does not limit the invention. Instead it provides examples and explanations to allow persons of ordinary skill to appreciate different ways to practice this invention. The following claims define the true scope and spirit of the invention.

What is claimed is:

1. A method for processing Integrated Services Digital Network User Part (ISUP) signaling messages in a switching system, said method comprising the steps of:

provisioning a trunk, wherein said trunk comprises a first endpoint originating at said switching system and a second endpoint terminating at said switching system;

identifying said ISUP signaling messages associated with said trunk; and routing said identified ISUP signaling messages internally within said switching system between said first endpoint and said second endpoint, wherein said ISUP signaling messages routed between said first and second endpoints are not sent to external SS7 entities outside of said switching system during routing.

2. The method of claim 1, wherein said step of provisioning said trunk comprises the step of identifying said trunk as a loopback trunk.

3. The method of claim 2, wherein said step of provisioning said trunk comprises the step of making said trunk available for service.

4. The method of claim 2, wherein said step of provisioning said trunk comprises the step of identifying said first and second endpoints.

5. The method of claim 1, wherein said identified ISUP signaling messages include a trunk maintenance message.

6. The method of claim 1, wherein said identified ISUP signaling messages include a call processing message.

7. The method of claim 1 wherein said switching system uses a single point code in association with said first and second endpoints.

8. An apparatus for processing Integrated Services Digital Network User Part (ISUP) signaling messages in a switching system, comprising:

means for provisioning a trunk, wherein said trunk comprises a first endpoint originating at said switching system and a second endpoint terminating at said switching system;

means for identifying said ISUP signaling messages associated with said trunk; and means for routing said identified ISUP signaling messages internally within said switching system between said first endpoint and said second endpoint, wherein said ISUP signaling messages routed between said first and second endpoints are not sent to external SS7 entities outside of said switching system during routing.

9. The apparatus of claim 8 wherein said switching system uses a single point code in association with said first and second endpoints.

10. A communications network, comprising:

a first and a second switching system;

a first trunk interconnecting said first switching system with said second switching system;

a second trunk including a first endpoint and a second endpoint, said first endpoint originating from said first switching system, and said second endpoint terminating at said first switching system;

said first switching system comprising:

means for identifying Integrated Services Digital Network User Part (ISUP) signaling messages associated with said second trunk; and means for routing said identified ISUP signaling messages internally within said first switching system between said first endpoint and said second endpoint, wherein said ISUP signaling messages routed between said first and second endpoints are not sent to external SS7 entities outside of said switching system during routing.

11. The communications network of claim 10, wherein said first switching system includes means for provisioning said second trunk.

12. The communications network of claim 10, wherein said identified ISUP signaling messages include a trunk maintenance message.

13. The communications network of claim 10, wherein said identified ISUP signaling messages include a call processing message.

14. The communication network of claim 10 wherein said switching system uses a single point code in association with said first and second endpoints.

15. A computer-readable medium capable of configuring a switching system to perform a method of processing Integrated Services Digital Network User Part (ISUP) signaling messages within a switching system, said method comprising the steps of:

provisioning a trunk, said trunk comprises a first endpoint originating at said switching system and a second endpoint terminating at said switching system;

identifying said ISUP signaling messages associated with said first endpoint; and routing said identified ISUP signaling messages internally within said switching system between said first endpoint and said second endpoint, wherein said ISUP signaling messages routed between said first and second endpoints are not sent to external SS7 entities outside of said switching system during routing.

16. The computer readable medium of claim 15 wherein said switching system uses a single point code in association with said first and second endpoints.

* * * * *